(12) United States Patent
Kitagawa

(10) Patent No.: US 8,264,178 B2
(45) Date of Patent: Sep. 11, 2012

(54) BRUSHLESS MOTOR CONTROL APPARATUS, BRUSHLESS MOTOR AND CONTROL METHOD OF BRUSHLESS MOTOR

(75) Inventor: Takayuki Kitagawa, Toyohashi (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 342 days.

(21) Appl. No.: 12/662,410

(22) Filed: Apr. 15, 2010

(65) Prior Publication Data

US 2010/0264863 A1 Oct. 21, 2010

(30) Foreign Application Priority Data

Apr. 16, 2009 (JP) ................. 2009-100236

(51) Int. Cl.
*H02P 6/00* (2006.01)
*H03K 5/00* (2006.01)
(52) U.S. Cl. ............. 318/400.1; 318/400.2; 318/400.26
(58) Field of Classification Search ............. 318/400.05, 318/400.1, 400.2, 400.13, 400
See application file for complete search history.

(56) References Cited

U.S. PATENT DOCUMENTS

| 2005/0275362 A1* | 12/2005 | Yamamoto et al. ........... 318/254 |
| 2008/0180047 A1* | 7/2008 | Bonvin ..................... 318/400.06 |
| 2008/0252241 A1* | 10/2008 | Yu et al. ................... 318/400.14 |
| 2009/0134822 A1* | 5/2009 | Hamasaki et al. ........ 318/400.04 |
| 2009/0134826 A1* | 5/2009 | Hamasaki ................ 318/400.32 |

FOREIGN PATENT DOCUMENTS

| JP | B2-2692103 | 9/1997 |
| JP | B2-2731647 | 12/1997 |
| JP | B2-3611423 | 10/2004 |
| JP | B2-3854186 | 9/2006 |

* cited by examiner

*Primary Examiner* — Mark Budd
(74) *Attorney, Agent, or Firm* — Posz Law Group, PLC

(57) ABSTRACT

A slope counter starts countdown at timing of changing an output voltage of an FET to zero. A controller executes a nonsymmetrical energization control operation to control a PWM generator such that the PWM generator generates a PWM signal based on a count value of the slope counter and outputs the generated PWM signal to the FET. The countdown of the slope counter is terminated when a predetermined time period elapses or when a time period corresponding to an electrical angle of 40 degrees elapses before the elapsing of the predetermined period. Also, at this time, the controller terminates the nonsymmetrical energization control operation.

7 Claims, 11 Drawing Sheets

COMPLEMENTARY PWM CONTROL SCHEME

LOWER-ARM PWM CONTROL SCHEME

BRUSHLESS MOTOR CONTROL APPARATUS, BRUSHLESS MOTOR AND CONTROL METHOD OF BRUSHLESS MOTOR

CROSS REFERENCE TO RELATED APPLICATION

This application is based on and incorporates herein by reference Japanese Patent Application No. 2009-100236 filed on Apr. 16, 2009.

BACKGROUND OF THE INVENTION

1. Field of the Invention

The present invention relates to a brushless motor control apparatus, a brushless motor and a control method of the brushless motor.

2. Description of Related Art

Some blower motors are formed as a multi-phase brushless motor. In a control apparatus of such a brushless motor, semiconductor elements (switching elements) are turned on and off to apply a voltage of a rectangular wave to each corresponding one of coils of multiple phases of the motor, so that a rotor of the motor is rotated. When the energization of one of the coils is turned off at the timing of changing the active phase of the motor to another phase, a return current flows through the corresponding coil to generate a torque ripple, thereby resulting in generation of annoying sound and vibration.

In view of the above disadvantage, a technique has been proposed to limit the generation of the sound and vibration by slowing down the change of the energization from one coil to another coil. For example, Japanese Patent No. 2692103B teaches a technique of shaping a rectangular wave signal into a bilaterally symmetric trapezoidal wave signal through use of a current, which is set based on a speed signal received from a rotational speed sensing circuit. Alternatively, Japanese Patent No. 2731647B teaches a technique of generating a drive current of a motor. According to this technique, a triangular wave, which matches with a rectangular wave, is generated by using an analogue technique. The thus generated triangular wave is combined with the rectangular wave to form a bilaterally symmetric trapezoidal wave, which is then used to generate the drive current. Further alternatively, Japanese patent No. 3611423B teaches a technique of generating a voltage of a bilaterally symmetric trapezoidal wave based on an output of an up/down counter that executes up-counting, holding or down-counting.

Furthermore, Japanese Patent No. 3854186B teaches a technique of generating a voltage of a bilaterally symmetric trapezoidal wave by a pulse width modulation (PWM) signal to more slowly or gradually change the energization of one coil to another coil at the time of turning off the energization of the coil.

In the case of the technique recited in Japanese Patent No. 2692103B, the motor, to which the above technique is applied, is a half-wave motor. When the technique of Japanese Patent No. 2692103B is applied to a full-wave motor, which is often used as a high-current motor, a circuit size is disadvantageously doubled. Furthermore, in the case of the technique recited Japanese Patent No. 2731647B, the circuit structure is disadvantageously complicated. In addition, in the case of the technique recited in Japanese patent No. 3611423B, the up/down counter needs to be provided to each of the phases of the motor.

Furthermore, the techniques recited in Japanese Patent No. 2692103B, Japanese Patent No. 2731647B and Japanese patent No. 3611423B, respectively, use a linear control scheme, which changes the voltage supplied to the motor, and is not suitable for the PWM control scheme that changes a time ratio of ON and OFF of the voltage supplied to the motor.

Furthermore, in the case of the technique recited in Japanese Patent No. 3854186B, a control apparatus, which uses a microcomputer, is used. Therefore, the circuit structure becomes disadvantageously complicated.

SUMMARY OF THE INVENTION

The present invention addresses the above disadvantages. According to the present invention, there is provided a brushless motor control apparatus, which includes a voltage supplying means, a pulse width modulation (PWM) signal generating means, a counter and a control means. The voltage supplying means is for supplying a voltage of a rectangular wave from each of a plurality of pairs of switching elements to a corresponding one of a plurality of windings of a brushless motor. The switching elements of each pair are connected with each other in series. The PWM signal generating means is for generating and outputting a PWM signal to drive the plurality of pairs of switching elements of the voltage supplying means. The counter counts down to zero from a maximum value of the PWM signal through a predetermined time period. The control means is for controlling the PWM signal generating means such that the PWM signal generating means generates and outputs a PWM signal, which corresponds to a count value of the counter, for the predetermined time period from timing of changing the voltage of the rectangular wave, which is supplied from the voltage supplying means, to zero.

According to the present invention, there is also provided a brushless motor including the brushless motor control apparatus.

According to the present invention, there is also provided a control method of the brushless motor. According to the method, a voltage of a rectangular wave is supplied from each of a plurality of pairs of switching elements to a corresponding one of a plurality of windings of a brushless motor by a voltage supplying means. The switching elements of each pair are connected with each other in series. A pulse width modulation (PWM) signal is generated and is outputted to drive the plurality of pairs of switching elements of the voltage supplying means by a PWM signal generating means. There is executed counting down to zero from a maximum value of the PWM signal through a predetermined time period by a counter. The PWM signal generating means is controlled by a control means such that the PWM signal generating means generates and outputs a PWM signal, which corresponds to a count value of the counter, for the predetermined time period from timing of changing the voltage of the rectangular wave, which is supplied from the voltage supplying means, to zero.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. In the present embodiment, a brushless motor and a brushless motor control apparatus are applied to a motor actuator of an air conditioning system of a vehicle (hereinafter, referred to as a vehicle air conditioning system).

Figure 1:
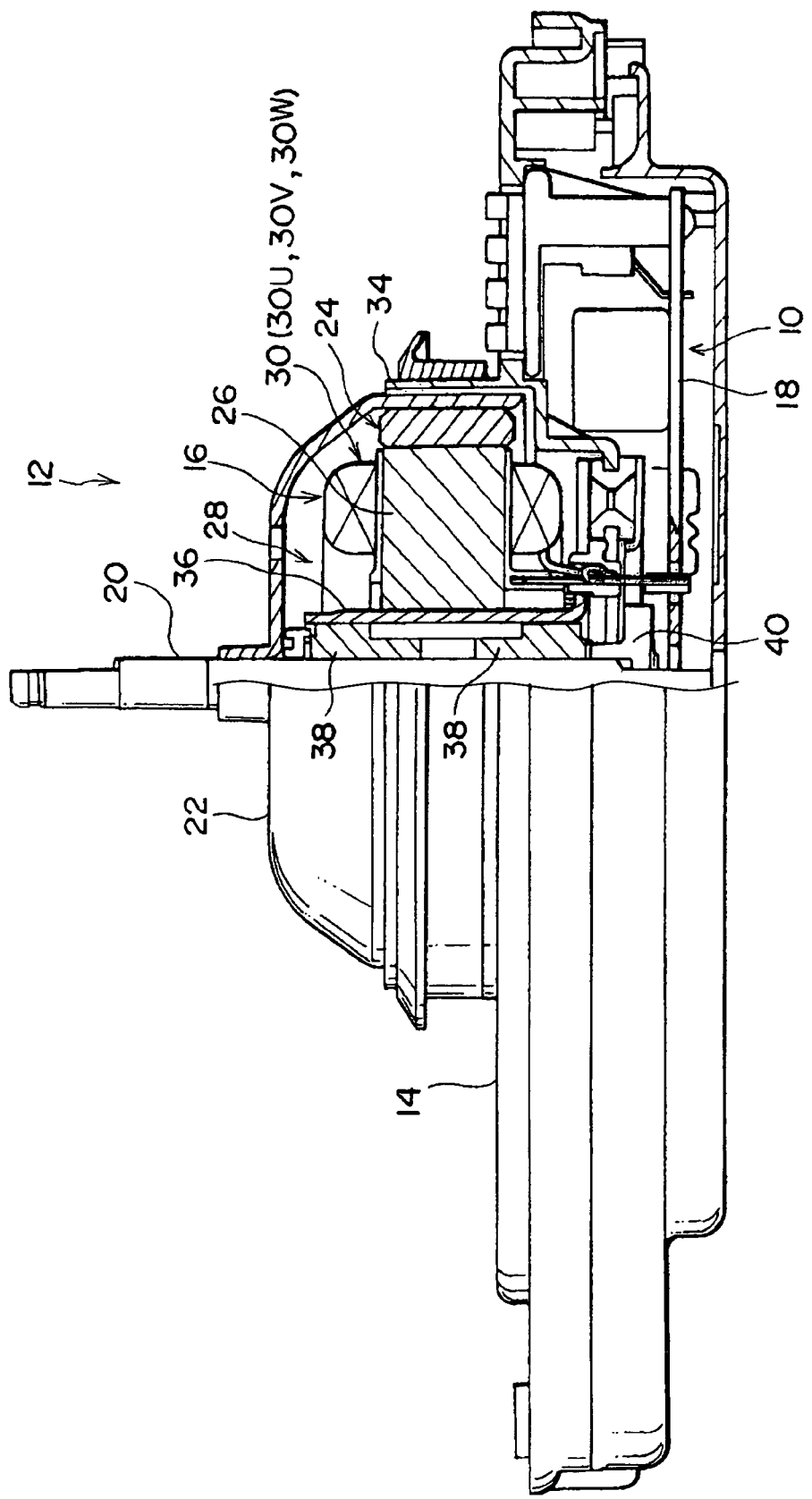
FIG. 1 is a partially fractured front view of a motor actuator, which includes a brushless motor control apparatus and a brushless motor, according to an embodiment of the present invention.

A structure of the motor actuator for the vehicle air condition system will be schematically described. FIG. 1 is a partially fractured front view of the motor actuator of the present embodiment.

As shown in FIG. 1, the motor actuator 12 of the present embodiment includes a housing 14, which receives a brushless motor 16 (hereinafter, also simply referred to as a motor 16) and a control circuit board 18 of a brushless motor control apparatus 10 (hereinafter, referred to as a motor control apparatus 10).

As shown in FIG. 1, the housing 14 is configured into a shallow box shape having an opening at one end part thereof. A generally cylindrical tubular portion 34 is integrally formed at the opening end part of the housing 14.

A support portion 36, which is configured into a generally cylindrical tubular form, is provided to the housing 14. A stator 28 is integrally installed to an outer peripheral part of the support portion 36. The stator 28 has a core 26, which is a laminated core that includes a plurality of thin steel plates stacked one after another. Coils (a group of coils, i.e., a group of windings) 30, which include coils 30U, 30V, 30W of three phases, are wound around the core 26. When it is not necessary to distinguish the respective coils 30U, 30V, 30W, these coils 30U, 30V, 30W will be collectively referred to as the coils 30. On the other hand, when it is necessary to distinguish the respective coils 30, the alphabet "U", "V" or "W" will be added to the numeral 30. The coils 30 are phase shifted by the electrical angle of 120 degrees from each other. When the coils 30 are alternately energized at the predetermined cycles (predetermined intervals), a predetermined rotational magnetic field is formed around the stator 28.

Two bearings 38 are fixed to an inner peripheral surface of the support portion 36 to support a shaft 20 in such a manner that the shaft 20 is coaxial with the support portion 36 and the tubular portion 34 and is rotatable about a rotational axis thereof.

One axial end part of the shaft 20 axially protrudes from the tubular portion 34. An undepicted blower fan of the air conditioning system is fixed to the one axial end part or its adjacent part of the shaft 20 and is rotated by a rotational force of the shaft 20.

A rotor 22 is integrally installed to a protruding part of the shaft 20, which protrudes from the tubular portion 34. The rotor 22 is configured into an inverted cup shaped body, which has an ceiling wall and a peripheral wall axially downwardly extending from the ceiling wall. The rotor 22 is coaxial with the tubular portion 34 and the support portion 36, which open in an opposite direction that is opposite from an opening direction of the opening end part of the housing 14. The shaft 20 extends through the ceiling wall of the rotor 22.

A generally cylindrical tubular rotor magnet 24 is coaxially fixed to an inner peripheral surface of the rotor 22. The rotor magnet 24 is radially magnetized, so that an N-pole is formed in one of a radially inner side and a radially outer side of each corresponding segment of the rotor magnet 24, and an S-pole is formed in the other one of the radially inner side and the radially outer side of the corresponding segment of the rotor magnet 24. Furthermore, the opposite magnetic poles are alternately arranged one after another in a circumferential direction about a rotational axis of the rotor magnet 24 to have alternating magnetic poles, each of which extends for a predetermined angle (e.g., 60 degrees) in the circumferential direction.

The rotor magnet 24 is placed outward of the stator 28 in the radial direction of the support portion 36 to radially oppose the stator 28. When the coils 30 are sequentially energized to generate the rotational magnetic field around the stator 28, a rotational force is generated at the rotor magnet 24 around the support portion 36 due to an interaction between thus generated rotational magnetic field and a magnetic field generated by the rotor magnet 24. Thereby, the shaft 20 is rotated.

The control circuit board 18 is placed on one axial side of the stator 28 where the bottom wall of the housing 14 is located. The control circuit board 18 has a printed circuit on at least one of a front surface and a rear surface of the control circuit board 18. Furthermore, in the control circuit board 18, functional elements, such as resistance elements, transistor elements, a microcomputer (CPU), are appropriately connected through corresponding printed wiring in the printed circuit.

Next, the structure of the motor control apparatus 10 (the control circuit board 18) will be schematically described. The motor control apparatus 10 (the control circuit board 18) includes a custom integrated circuit (IC). The motor control apparatus 10 of the present embodiment adjusts a duty ratio of a PWM signal to control a rotational speed of the motor 16, thereby limiting heat generated from power supply elements (upper and lower FETs 74, 76). That is, the motor control apparatus 10 drives the motor 16 by a pulse-width modulation (PWM) control operation.

Figure 2:
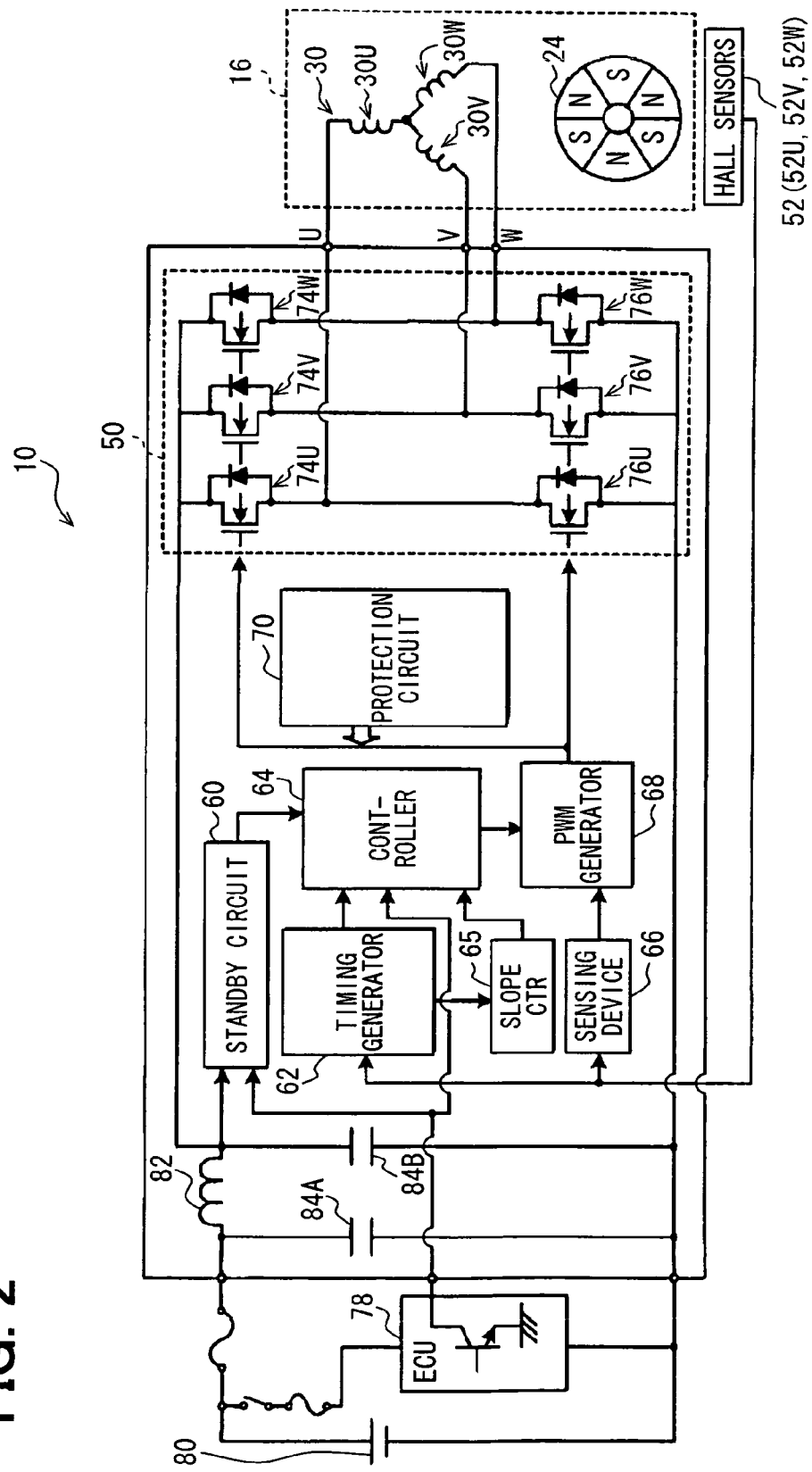
FIG. 2 is a block diagram showing a structure of the motor control apparatus of the embodiment.

FIG. 2 is a block diagram showing an example of the structure of the motor control apparatus 10 of the present embodiment. In FIG. 2, the motor 16 is formed as a three-phase, six-pole motor.

The motor control apparatus 10 of the present embodiment has the Hall sensors (Hall ICs or Hall elements) 52 and a sensor magnet 40 (see FIG. 1).

As shown in FIG. 1, the sensor magnet 40 is coaxially and integrally fixed to the other axial end part of the shaft 20. Similar to the rotor magnet 24, the sensor magnet 40 is a permanent magnet. The sensor magnet 40 is a multipolar magnet, in which N-poles and S-poles are alternately arranged one after another at predetermined angular intervals (e.g., 60 degree intervals) in the circumferential direction about the rotational axis.

The Hall sensors 52 sense a magnetic field, which is generated by the sensor magnet 40, to sense the rotational position of the rotor 22. The Hall sensors 52 include three Hall sensors 52U, 52V, 52W, which correspond to the U-phase, the V-phase and the W-phase, respectively. The Hall sensors 52U, 52V, 52W are opposed to the sensor magnet 40 and are arranged one after another at 20 degree intervals in the circumferential direction about the rotational axis of the sensor magnet 40. The Hall sensors 52U, 52V, 52W sense the magnetic lines of flux, which constitute the magnetic field of the sensor magnet 40, and output position measurement signals (specifically, an output signal U, an output signal V and an output signal W), respectively.

A power supply device (serving as a voltage supplying means) 50, a standby circuit 60, a drive timing generator 62, a controller (serving as a control means) 64, a slope counter 65, a rotational speed (rpm) sensing device 66, a PWM generator (serving as a PWM signal generating means) 68 and a protection circuit 70 are provided on the control circuit board 18 of the motor control apparatus 10. The motor control apparatus 10 further includes an air conditioning electronic control unit (ECU) 78, an electric power source 80, a power-factor improving reactor 82 and smoothing capacitors 84A, 84B. The electric power source 80, the power-factor improving reactor 82 and the smoothing capacitors 84A, 84B form a generally direct current electric power source, which supplies a generally direct current. The air conditioning ECU 78 is the electronic control unit of the vehicle air conditioning system. When a user turns on the vehicle air conditioning system through the air conditioning ECU 78, the motor 16 is rotated through a control operation executed by the motor control apparatus 10. When the user adjusts an operational state of the air conditioning system to change the rotational speed of the motor 16, a signal, which commands a rotational speed of the motor 16 (rotor 22), is supplied to the motor control apparatus 10 through the air conditioning ECU 78.

The standby circuit 60 controls the electric power supply from the electric power source 80 to each corresponding component. The standby circuit 60 of the present embodiment limits a weak current, which flows from the electric power source 80 to the air conditioning system, even in an air conditioning stop state.

The drive timing generator 62 generates the timing (timing signal) for driving the rotor 22 based on the output signals U, V, W, which are supplied from the Hall sensors 52 and indicate the sensed rotational position of the rotor 22.

The rotational speed sensing device 66 senses the rotational speed of the rotor 22 based on the output signals U, V, W, which are supplied from the Hall sensors 52.

When the electric power is supplied from the standby circuit 60, the controller 64 outputs a control signal to the PWM generator 68 based on the drive timing (timing signal) generated by the drive timing generator 62 and the command rotational speed of the rotor 22 commanded from the air conditioning ECU 78 to control an angular velocity (advance angle) of the rotor 22.

Figure 4A:
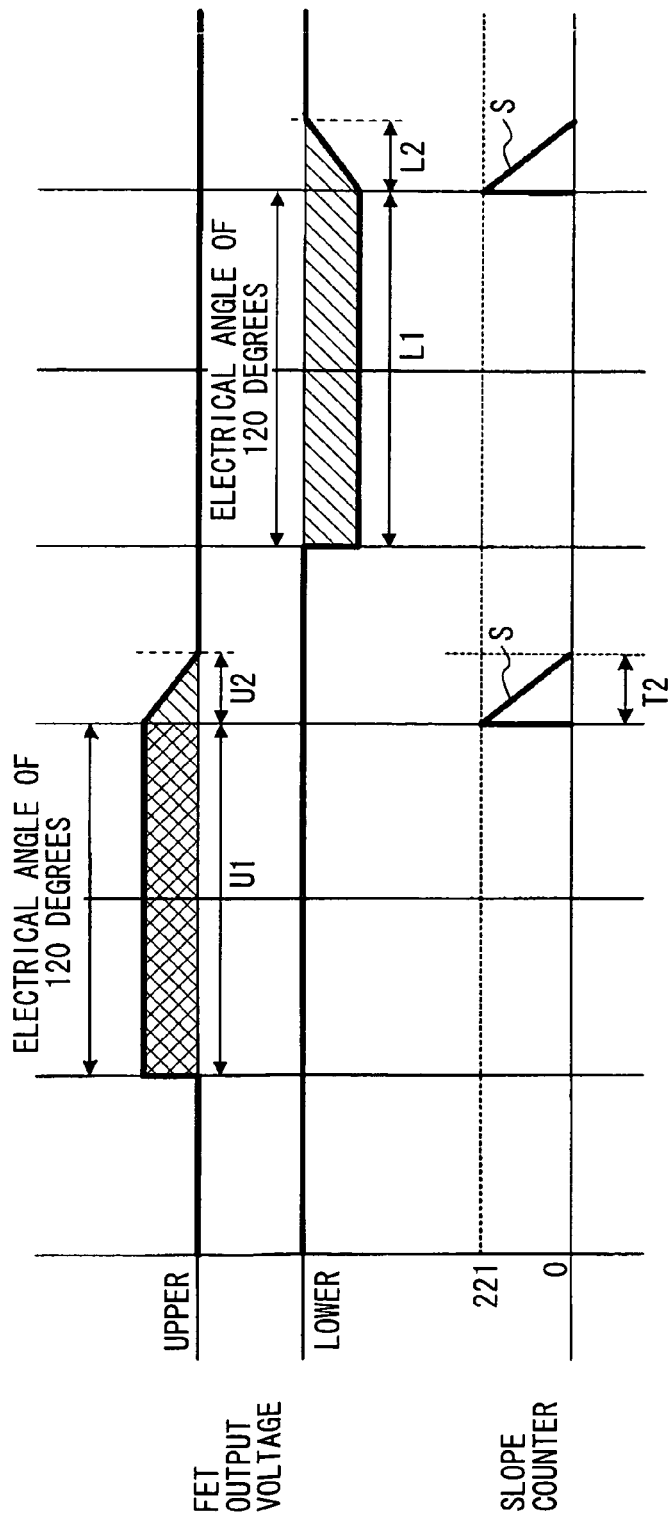
FIG. 4A is a schematic diagram for describing an example of a slope counter of the embodiment.

The controller 64 controls the PWM generator 68 such that the PWM generator 68 generates and outputs a PWM signal to each corresponding one of the FETs 74, 76 based on a count value of the slope counter 65 during a predetermined period (a period U2 for the upper FET 74 and a period L2 for the lower FET 76 in FIG. 4A). This predetermined period (the period U2 for the upper FET 74 and the period L2 for the lower FET 76) starts from an end of an energization period corresponding to a predetermined electrical angle (an end of a period U1 corresponding to the electrical angle of 120 degrees for the upper FET 74 and an end of a period L1 corresponding to the electrical angle of 120 degrees for the lower FET 76), during which the energization of the FET 74, 76 is executed without relying on the count value of the slope counter 65. The end of the above energization period (the period U1 for the upper FET 74 and the period L1 for the lower FET 76) will be also referred to as timing of changing the output voltage of the FET 74, 76 to the coil 30 to zero in the energization executed without relying on the count value of the slope counter 65, i.e., timing of changing the voltage of the rectangular wave generated in the period U1, L1 of the energization. Furthermore, this control operation will be hereinafter referred to as a nonsymmetrical energization control operation.

The PWM generator 68 determines the drive duty value (DUTY) D2 based on the output of the rotational speed sensing device 66 and the control signal of the controller 64. Then, the PWM generator 68 executes the PWM control operation, specifically, the PWM generator 68 generates and outputs the PWM signal that is the pulse signal having the pulse width that corresponds to the level of the signal received from the air conditioning ECU 78.

The PWM generator 68 includes a drive duty determining device and a PWM timer (not shown). The PWM generator 68 generates the signal, which has the pulse width that corresponds to the determined drive duty value D2, by using the PWM timer. Then, this signal is outputted from the PWM generator 68 as the PWM signal. In the present embodiment, the output duty value is a digital value.

Figure 3:
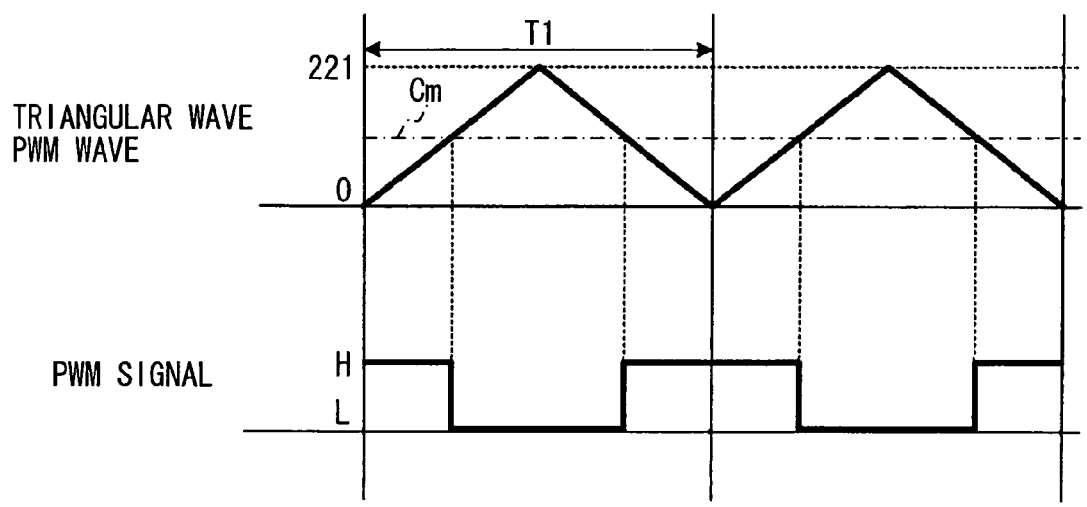
FIG. 3 is a schematic diagram for describing an example of a PWM generator of the embodiment.

FIG. 3 shows a carrier wave having a symmetrical triangular waveform along with a command signal (reference signal) Cm at the upper side of FIG. 3 and the PWM signal generated with reference to the carrier wave and the command signal Cm at the PWM generator 68 using the PWM timer at the lower side of FIG. 3. In the present embodiment, the PWM timer includes, for example, an up/down counter, which counts 0 to 221 (i.e., counting a total of 222 steps). The count value of 221 indicates 100% output of the PWM. Furthermore, the count value of 0 indicates 0% output of the PWM. For instance, in a case where the clock frequency of the circuit clock is 8 MHz, one clock is 1/8 MHz=125 ns, and one cycle T1 is 125 ns×222×2=55.5 μs. Therefore, the PWM cycle is 1/55.5 μs=18 kHz. Furthermore, in the case of FIG. 3, the duty ratio of the PWM signal may be raised by raising the level of the command signal Cm, and the duty ratio of the PWM signal may be lowered by lowering the level of the command signal. Cm.

In the present embodiment, the PWM generator 68 outputs the PWM signal (see FIG. 3), which is generated by using the PWM timer, to the gate of each corresponding one of the lower FETs 76 to output the voltage shown in FIG. 4A in each corresponding period L1, which corresponds to the electrical angle of 120 degrees and is determined based on the output of the corresponding Hall sensor. In contrast, the PWM generator 68 outputs the predetermined signal, which is not processed through the PWM control operation, i.e., which is generated without using the PWM timer, to the gate of each corresponding one of the upper FETs 74 to output the voltage shown in FIG. 4A in each corresponding period U1, which corresponds to the electrical angle of 120 degrees and is determined based on the output of the corresponding Hall sensor. For the descriptive purpose, these signals outputted from the PWM generator 68 are collectively referred to as the PWM signals and include both of the signal, which is generated by using the PWM timer, and the signal, which is generated without using the PWM timer.

The PWM generator 68 is controlled by the controller 64 to execute the following operation from the timing of changing the output voltage of the FET 74, 76 to the corresponding coil 30 to zero until elapsing of the predetermined time period, i.e. to execute the following operation during the period U2 for the upper FET 74 and the period L2 for the lower FET 76 shown in FIG. 4A. That is, the PWM generator 68 determines the drive duty value D2 based on the count value of the slope counter 65 and generates the PWM signal, which has the pulse width corresponding to the determined drive duty value D2, by using the PWM timer. Thereafter, the PWM generator 68 outputs the generated PWM signal to the gate of the corresponding FET 74, 76.

Figure 4B:
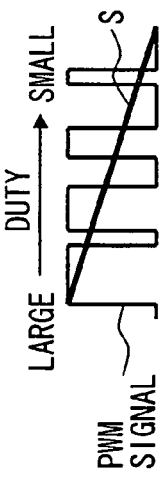
FIG. 4B is a schematic diagram for describing a PWM signal generated based on a count value of the slope counter according to the embodiment.

The slope counter 65 is constructed as a counter circuit. The slope counter 65 starts the countdown from the timing of the end of changing the output voltage of the FET 74, 76 to the corresponding coil 30 to zero based on the drive timing generated at the drive timing generator 62 and outputs the count value to the controller 64. In the present embodiment, as shown in FIG. 4A, the slope counter 65 starts its counting operation at the timing of changing the output voltage of each of the upper FETs 74 and the lower FETs 76 to zero. In the case of the upper FET 74, the slope counter 65 counts down from the PWM timer's maximum count value of 221 to the PWM timer's minimum count value of 0 (zero) and outputs the count value. At that time, the PWM signal, which is similar to the one shown in FIG. 4B, is generated through the PWM timer of the PWM generator 68 based on the count value (see the slope S in FIGS. 4A and 4B) of the slope counter 65. Specifically, in the case of FIG. 4B, the level of the command signal Cm (see FIG. 3) is progressively reduced based on the count value of the slope counter 65 to progressively reduce the duty ratio, so that the slope is created in the output voltage of each of the upper FETs 74 in the period U2 (see FIG. 4A) immediately after the timing of changing the output voltage of the upper FET 74 to zero (i.e., at the end of the period U1). Here, it should be noted that the slope angle of the slope S of FIG. 4B is changed from the slope angle of the slope S of FIG. 4A only for the purpose of illustrating the change in the PWM signal. Similarly, the slope is created in the output voltage of each of the lower FETs 76 in the period L2 (see FIG. 4A) immediately after the timing of changing the output voltage of the lower FET 76 to zero (i.e., at the end of the period L1). In the present embodiment, one count of the slope counter 65 takes 4 μs, so that the down-count time period (slope interval) T2 is 4 μs×222=0.888 ms. Therefore, in the present embodiment, the predetermined time period is 0.888 ms. This predetermined time period (the time period of the slope interval) is determined in advance through experiments in view of, for example, the characteristics of the motor 16, the circuit characteristics and the efficiency.

The protection circuit 70 is provided to limit a damage of the FETs 74, 76 caused by heat. Specifically, when an inappropriate electric current, which causes an excess load state, flows in the coils 30, the protection circuit 70 forcefully turns off all of the FETs 74, 76 to turn off the energization of the coils 30, i.e., to turn off the supply of the current to the coils 30.

The power supply device 50 includes a three-phase (U-phase, V-phase and W-phase) inverter. With reference to FIG. 2, the power supply device 50 includes the upper FETs 74, more specifically, three N-channel metal oxide semiconductor field effect transistors (MOSFETs) 74U, 74V, 74W, each of which will be hereinafter simply referred to as an FET 74U, 74V, 74W and serves as an upper switching element (or an upper semiconductor element). The power supply device 50 further includes the lower FETs 76, more specifically, three N-channel metal oxide semiconductor field effect transistors (MOSFETs) 76U, 76V, 76W, each of which will be hereinafter simply referred to as an FET 76U, 76V, 76W and serves as a lower switching element (or a lower semiconductor element). When it is not necessary to distinguish the respective FETs 74U, 74V, 74W, these FETs will be collectively referred to as the FETs 74. Also, when it is not necessary to distinguish the respective FETs 76U, 76V, 76W, these FETs will be collectively referred to as the FETs 76. On the other hand, when it is necessary to distinguish the respective FETs 74, the alphabet "U", "V" or "W" will be added to the numeral 74. Also, when it is necessary to distinguish the respective FETs 76, the alphabet "U", "V" or "W" will be added to the numeral 76.

A source of the FET 74U and a drain of the FET 76U are connected to a terminal of the coil 30U. A source of the FET 74V and a drain of the FET 76V are connected to a terminal of the coil 30V. Furthermore, a source of the FET 74W and a drain of the FET 76W are connected to a terminal of the coil 30W.

The gates of the FETs 74 and the gates of the FETs 76 are connected to the PWM generator 68 to receive the corresponding PWM signal. When the PWM signal of the high level (H-level) is supplied to the gate of the FET 74, 76, the FET 74, 76 is placed in an ON state, so that the current flows from the drain to the source of the FET 74, 76. In contrast, when the PWM signal of the low level (L-level) is supplied to the gate of the FET 74, 76, the FET 74, 76 is placed in an OFF state, so that the current does not flow from the drain to the source of the FET 74, 76.

The operation of the motor control apparatus 10 for implementing the nonsymmetrical energization will be described.

Figure 5:
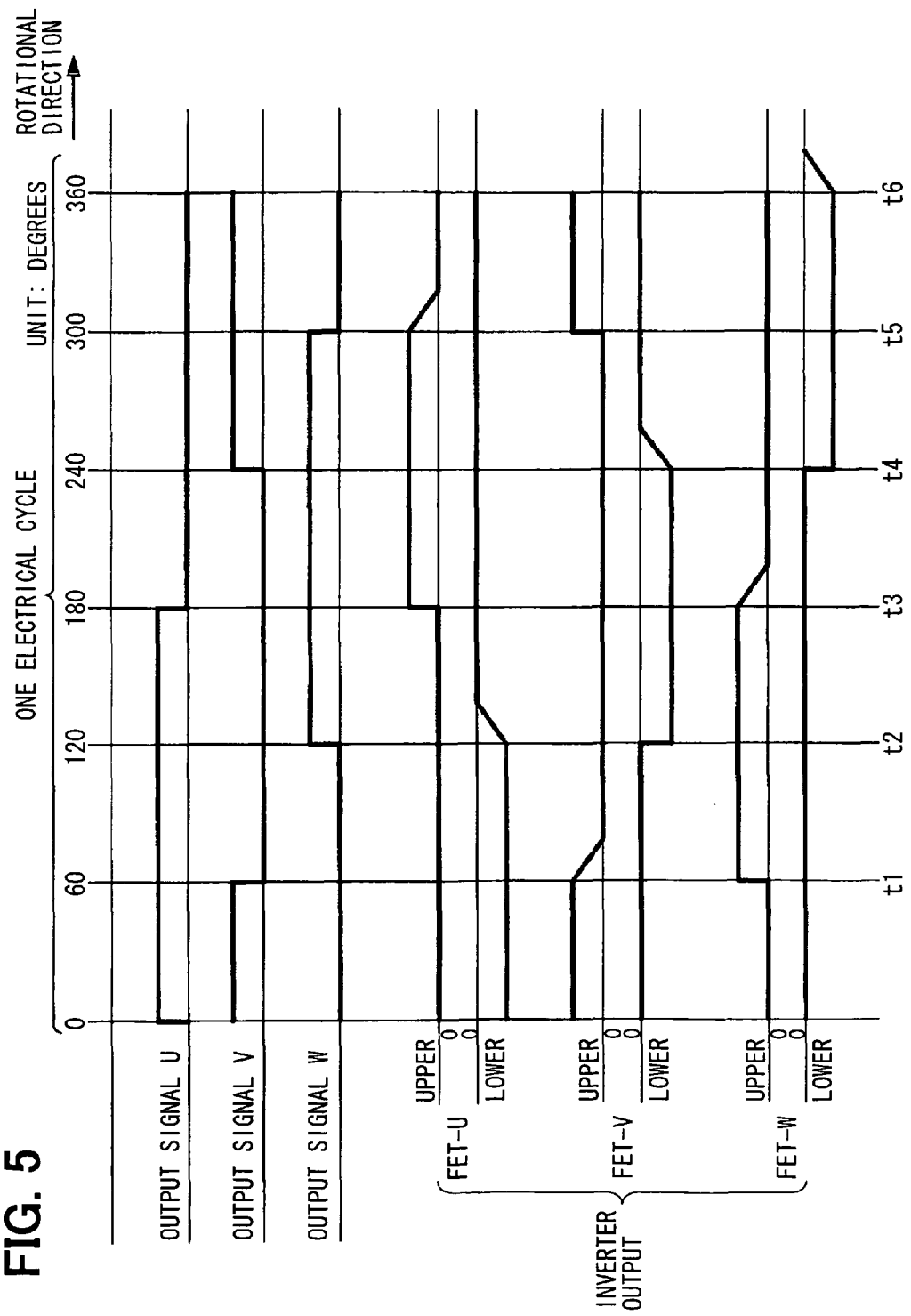
FIG. 5 is a time chart showing a relationship between output signals of Hall sensors and inverter output voltages of a power supply device at the brushless motor of the embodiment.

FIG. 5 is an exemplary time chart showing the output signals U, V, W of the Hall sensors 52U, 52V, 52W and the inverter output voltages of the power supply device 50 in the motor 16 of the present embodiment for one electrical cycle (i.e., for the electrical angle of 360 degrees). Furthermore, in FIG. 5, "UPPER" is for the output voltage of the corresponding upper FET 74, and "LOWER" is for the output voltage of the corresponding lower FET 76. When the output signal U, V, W is the H-level, it indicates the N-pole. In contrast, when the output signal U, V, W is the L-level, it indicates the S-pole.

Figure 6:
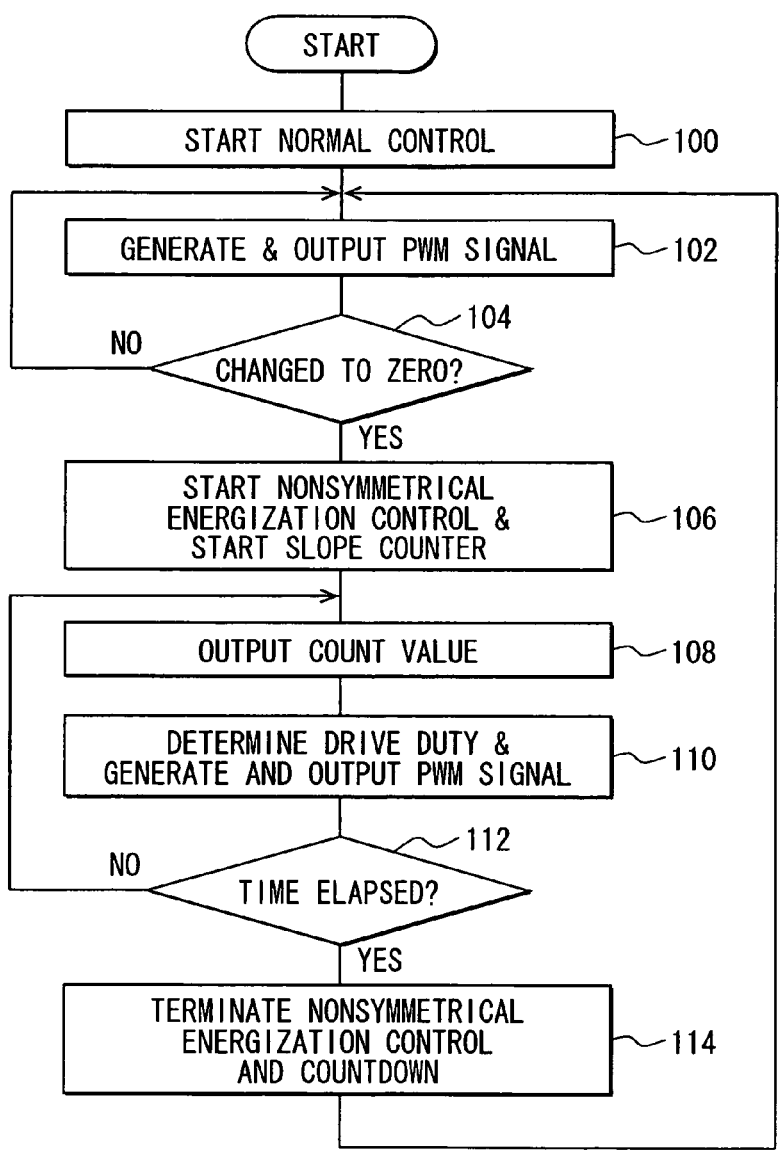
FIG. 6 is a flow chart showing an example of nonsymmetrical energization according to the embodiment.

FIG. 6 is a flowchart showing an example of the nonsymmetrical energization. In the present embodiment, when the air conditioning system is turned on by the user to drive the motor actuator 12, the flowchart shown in FIG. 6 starts. When the air conditioning system is turned off by the user, the operation of the flowchart is terminated.

At step 100, the controller 64 starts the normal control operation (the energization operation of the FETs 74, 76 without relying on the count value of the slope counter 65).

The controller 64 executes, for example, the energization control operation, which uses the advance angle. Therefore, the PWM generator 68 executes the other control operation(s) other than the nonsymmetrical energization control operation at this stage.

At step 102, the PWM generator 68 is controlled by the controller 64, so that the PWM generator 68 determines the drive duty value D2 and generates the corresponding PWM signal. The PWM generator 68 generates the PWM signal by setting the duty value D1, which is determined based on, for example, the rotational speed of the motor 16, as the drive duty value D2 (i.e., D1=D2). The PWM signal, which is the predetermined signal generated without using the PWM timer, is outputted from the PWM generator 68 to the gate of the corresponding upper FET 74. Furthermore, the PWM signal, which is generated by using the PWM timer, is outputted from the PWM generator 68 to the gate of the corresponding lower FET 76.

At step 104, it is determined whether it is the timing of changing the output voltage of the FET 74, 76 to the corresponding coil 30 to zero. In the case of the time chart shown in FIG. 5, it is determined whether it is one of timings t1-t6. When it is determined that it is not the timing of changing the output voltage of the FET 74, 76 to the coil 30 to zero, the operation returns to step 102 to maintain the generation and output of the corresponding PWM signal. In contrast, when it is determined that it is the timing of changing the output voltage of the FET 74, 76 to the coil 30 to zero, the operation proceeds to step 106.

At step 106, the controller 64 starts the nonsymmetrical energization control operation. Furthermore, the counting operation of the slope counter 65 is started to start the countdown from the count value of 221. At subsequent step 108, the controller 64 outputs the count value of the slope counter 65 to the PWM generator 68.

Thereafter, at step 110, the PWM generator 68 determines the drive duty value D2, and the PWM generator 68 generates and outputs the corresponding PWM signal.

The PWM generator 68 computes and determines the drive duty value D2 based on the count value of the slope counter 65 and the duty value that is determined according to, for example, the rotational speed of the motor 16.

The drive duty value D2 for each of the upper FETs 74 is determined based on the following equation (1). The drive duty value D2 for each of the lower FETs 76 is determined based on the following equation (2).

Drive Duty Value $D2=221-$Duty Value $D1\div2+$(Count Value$\times$Duty Value $D1\div221)\div2$     Equation (1)

Drive Duty Value $D2=$Duty Value $D1\div2+$(Count Value$\times$Duty Value $D1\div221)\div2$     Equation (2)

The PWM generator 68 generates the PWM signal based on the drive duty value D2 obtained through the equation (1) or the equation (2). Then, the PWM generator 68 outputs the thus generated PWM single to the gate of the corresponding FET 74, 76. Specifically, at the timing t1, the PWM generator 68 begins to output the PWM signal to the FET 74V. At the timing t2, the PWM generator 68 begins to output the PWM signal to the FET 76U. At the timing t3, the PWM generator 68 begins to output the PWM signal to the FET 74W. At the timing t4, the PWM generator 68 begins to output the PWM signal to the FET 76V. At the timing t5, the PWM generator 68 begins to output the PWM signal to the FET 74U. At the timing t6, the PWM generator 68 begins to output the PWM signal to the FET 76W.

At next step 112, it is determined whether the predetermined time period has elapsed. In the present embodiment, as the specific example discussed above, it is determined whether the slope time period T2 (=0.888 ms) has been elapsed based on, for example, a count value of a counter (not shown). When it is determined that the predetermined time period has not been elapsed at step 112, the operation returns to step 108 to repeat the process. In contrast, when it is determined that the predetermined time period has been elapsed at step 112, the operation proceeds to step 114.

At step 114, the controller 64 stops the nonsymmetrical energization control operation. Also, the slope counter 65 terminates the countdown. Thereafter, the operation returns to step 102, and the normal control operation and the generation and output of the corresponding PWM signal are executed until the next timing of changing the output voltage to zero.

In this way, each corresponding one of the FETs 74 and the FETs 76 provides the voltage of the nonsymmetrical waveform shown in FIG. 5 to the corresponding coil 30.

Figure 7:
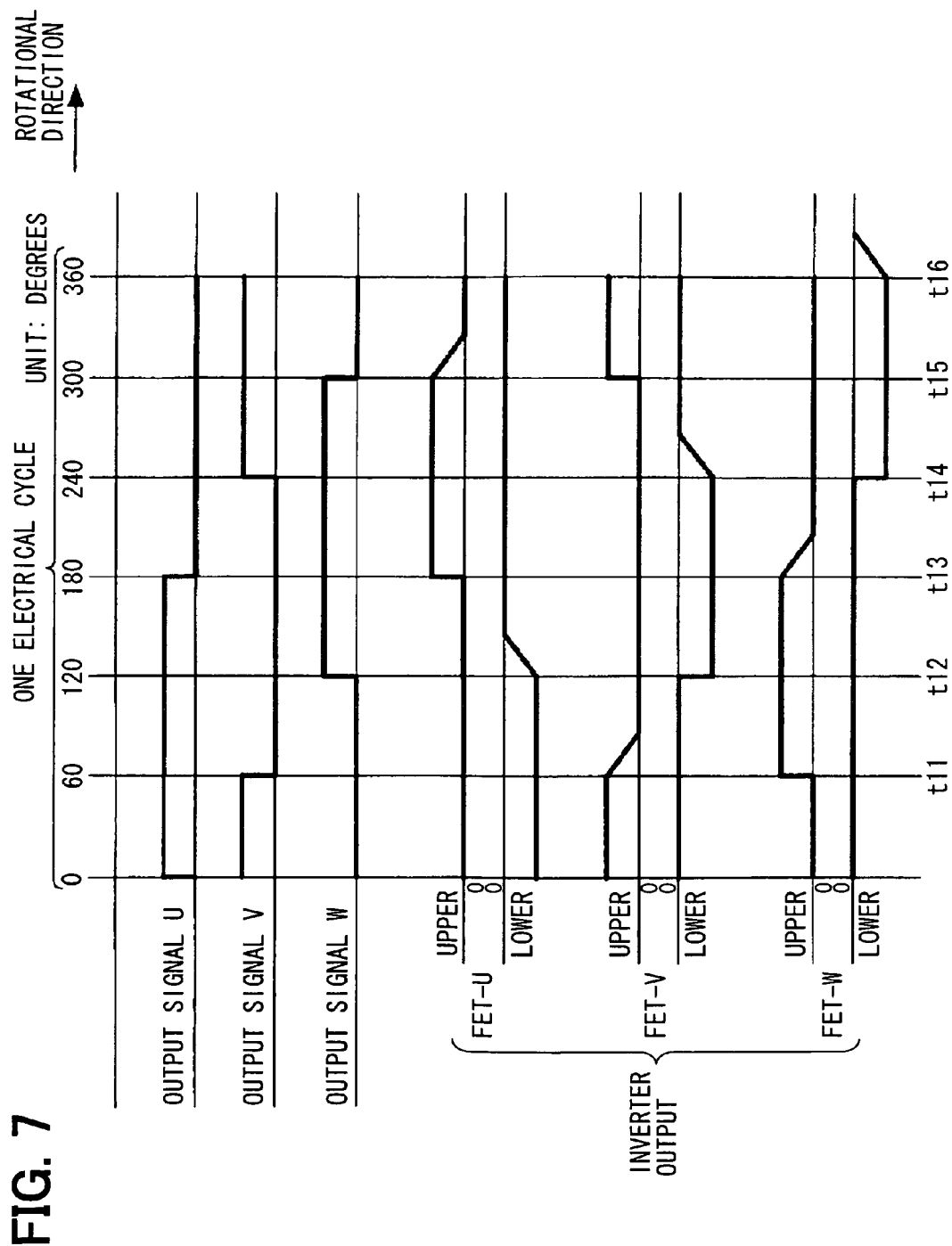
FIG. 7 is a time chart similar to FIG. 5, showing a case where a rotational speed of the motor is increased in comparison to that of the case shown in FIG. 5 according to the embodiment.
Figure 8:
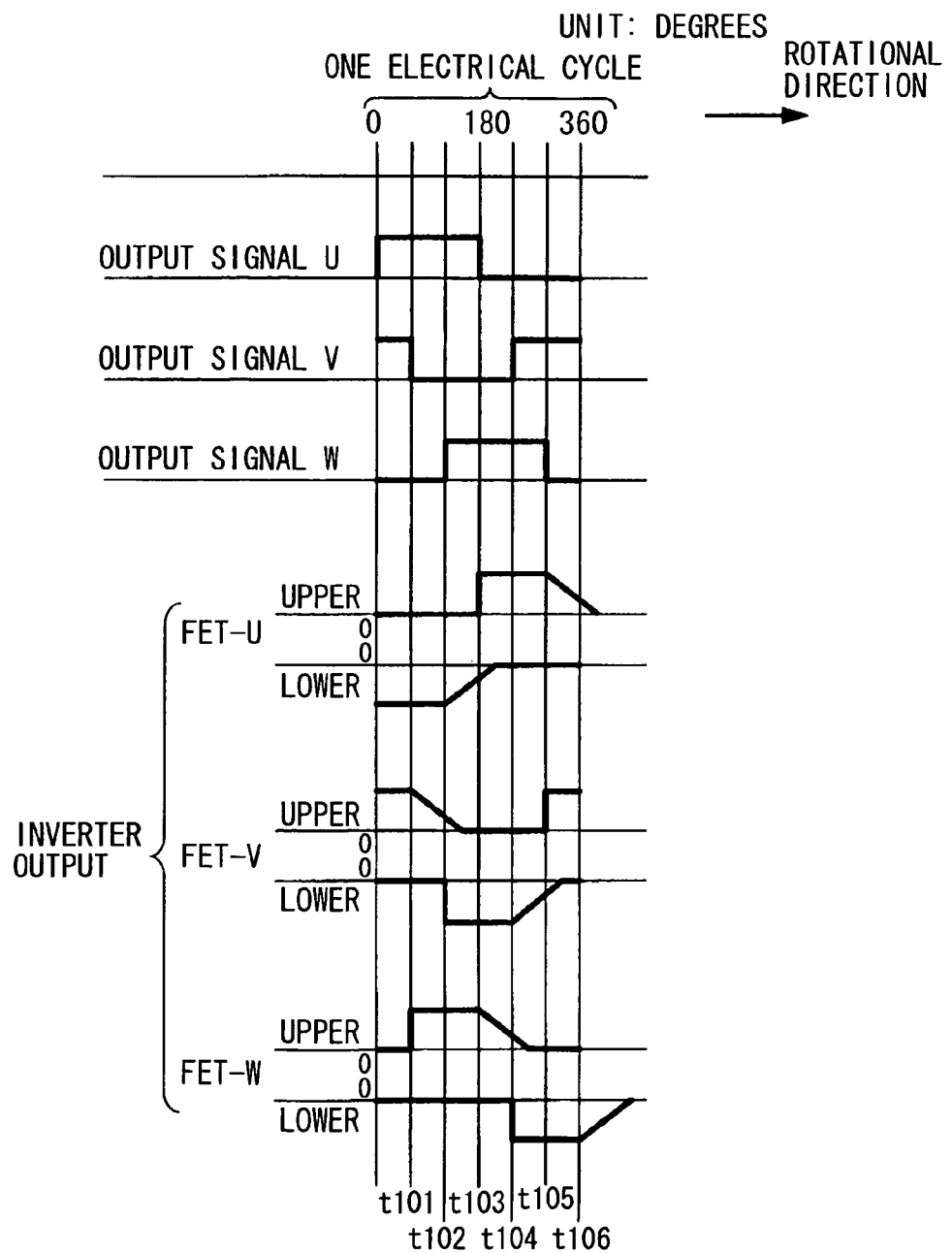
FIG. 8 is a time chart similar to FIG. 7, showing a case where the rotational speed of the motor is further increased in comparison to that of the case shown in FIG. 7 according to the embodiment.

Furthermore, in the present embodiment, although the slope time period T2 is constant, the period of the electrical angle cycle changes depending on the rotational speed of the motor 16 (rotor 22). Therefore, the electrical angle, which corresponds to the slope time period T2, is changed. For example, FIG. 7 shows the state of rotating the motor 16 at the higher rotational speed, which is higher than that of the state shown in FIG. 5. Furthermore, FIG. 8 shows the state of rotating the motor 16 at the higher rotational speed, which is higher than that of the state shown in FIG. 7. There is established the relationship of the timing t1, t2, t3, t4, t5, t6>the timing t11, t12, t13, t14, t15, t16>the timing t101, t102, t103, t104, t105, t106. As discussed above, when the rotational speed of the motor 16 is increased, the electrical angle of the slope is increased. Therefore, a ratio of the electrical angle of the slope relative to the electrical angle of 120 degrees of the rectangular wave is increased. In contrast, when the rotational speed of the motor 16 is decreased, the electrical angle of the slope is decreased. Therefore, a ratio of the electrical angle of the slope, relative to the electrical angle of 120 degrees of the rectangular wave is decreased.

Figure 9A:
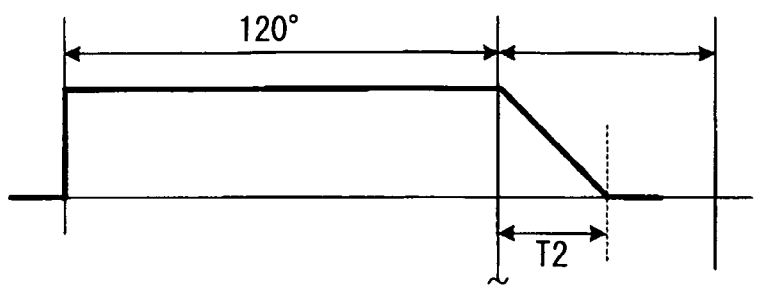
FIGS. 9A to 9C are schematic diagrams showing exemplary cases where the nonsymmetrical energization control operation is terminated at an electrical angle of 40 degrees according to the embodiment.
Figure 9B:
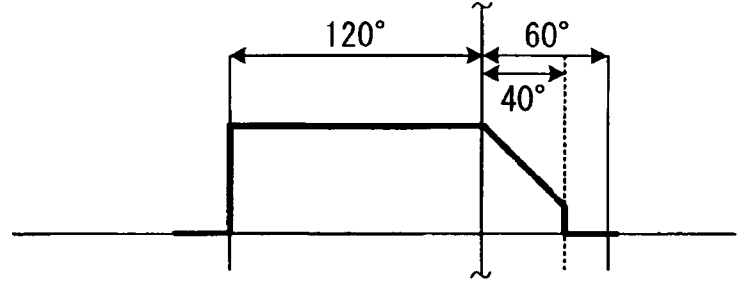
Figure 9C:
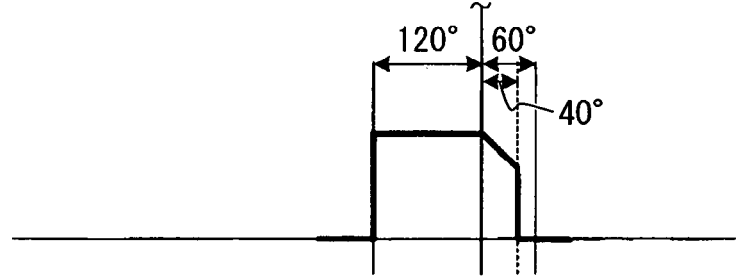

In the case where the electrical angle of the slope is more than 60 degrees (i.e., in the case where the total energization time period of the slope and of the rectangular wave is more than 180 degrees) at the subject FET 74, 76, the timing of changing the voltage of the other FET 74, 76 to zero is reached before the timing of changing the voltage of the subject FET 74, 76 to zero. Therefore, in the present embodiment, regardless of the slope time period, the nonsymmetrical energization control operation of the subject FET 74, 76 is terminated before elapsing of the period corresponding to the electrical angle of 60 degrees from the time of starting the nonsymmetrical energization control operation of the subject FET 74, 76 (from the timing of changing of the output voltage of the subject FET 74, 76 to zero), and the countdown of the slope counter 65 is terminated to clamp the output voltage. In the present embodiment, as indicated in FIGS. 9A to 9C showing exemplary cases, the output voltage of the FET 74, 76 is clamped when the period, which corresponds to the electrical angle of 40 degrees, is elapsed. However, this electrical angle is not limited to 40 degrees. That is, the electrical angle of 40 degrees may be changed to any other suitable angle as long as this angle is equal to or less than 60 degrees. In this way, it is possible to terminate the countdown before the timing of starting the next nonsymmetrical energization control operation. Therefore, even in the next nonsymmetrical energization control operation, the countdown can be executed using the same slope counter 65. As a result, the nonsymmetrical energization control operation can be per-formed on all of the FETs 74, 76 by using the single slope counter 65, so that it is possible to limit an increase in the circuit size.

The electrical angle, at which the nonsymmetrical energization control operation is stopped, may be set in advance through, for example, experiments based on the structure and characteristics of the motor and the ratio of the electrical angle of the slope relative to the electrical angle of the rectangular wave (120 degrees).

In the present embodiment, when the count value of the slope counter 65 is zero, the output voltage of the FET 74, 76 is in the L-level. In this way, it is possible to limit occurrence of flow of a minute current to the coil 30, which would occur unless the drive duty value is zero in the case where the count value is zero, so that the electrical current waveform of the motor can be stabilized.

Furthermore, in the case where the duty value D1 is 221 (i.e., the full count), the drive duty value D2 is set to its full value. In this way, the loss, which would be caused by the PWM control operation, can be eliminated, and the performance of the motor 16 at its full output can be improved.

Also, when the rotational speed of the motor is increased to the high speed, the electrical angle, which corresponds to the slope time period, is correspondingly increased. Therefore, in such a case, the advantage of providing the slope may be reduced. However, it will not pose a substantial practical disadvantage. In general, the blower motor is operable in a wide operational range from a low-speed mode, at which the rotational speed is low to generate the small amount of air flow, to a high-speed mode, at which the rotational speed is high to generate the large amount of air flow. Here, it should be noted that the sound and vibration may possibly become severe in the low-speed mode, at which the magnetoacoustic noise of the motor 16 becomes prominently noticeable because of the reduced amount of air flow and the reduced amount of wind noise at the low-speed mode. In other words, the noisy sound and vibration become less noticeable in the high-speed mode, at which the rotational speed of the motor is high. Rather, the efficiency is increased when the applied voltage has the rectangular wave with the increased pulse ON width larger than the electrical angle of 120 degrees.

Therefore, according to the present embodiment, in the case where the duty value D1 is 221 (full count), the addition of the slope can improve the efficiency of the motor 16 rather than the reduction of the noisy sound or vibration. In the present embodiment, the nonsymmetrical energization control operation is executed to add the slope until the electrical angle of, for example, 40 degrees is reached.

In the present embodiment, as discussed above, the PWM generator 68 outputs the PWM signal, which is generated by using the PWM timer, only to the lower FETs 76 in the period L1 shown in FIG. 4A. That is, in the present embodiment, instead of using a typical complementary PWM control scheme, there is used the lower-arm PWM control scheme, in which the PWM control operation is executed only to the lower FETs 76. However, the present invention is not limited to this scheme. That is, the complementary PWM control scheme may be alternatively used. However, in the case of the complementary PWM control scheme, an electrical angle counter and a dead time timer are required in addition to the PWM timer, thereby resulting in an increased circuit size. Furthermore, due to the influence of the dead time, it is not easy to output the maximum value of applied voltage. Therefore, it is desirable to use the lower-arm PWM control scheme like in the case of the present embodiment.

Figure 10A:
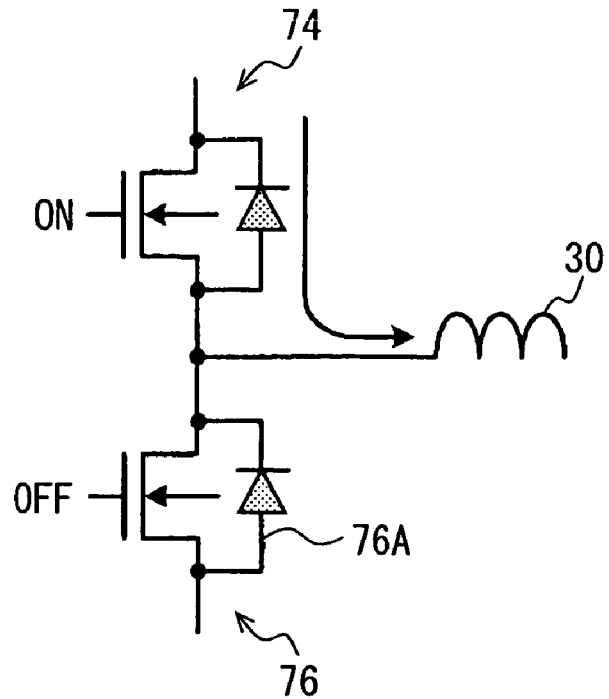
FIGS. 10A and 10B are schematic diagrams for describing a lower-arm PWM control scheme according to the embodiment.
Figure 10B:
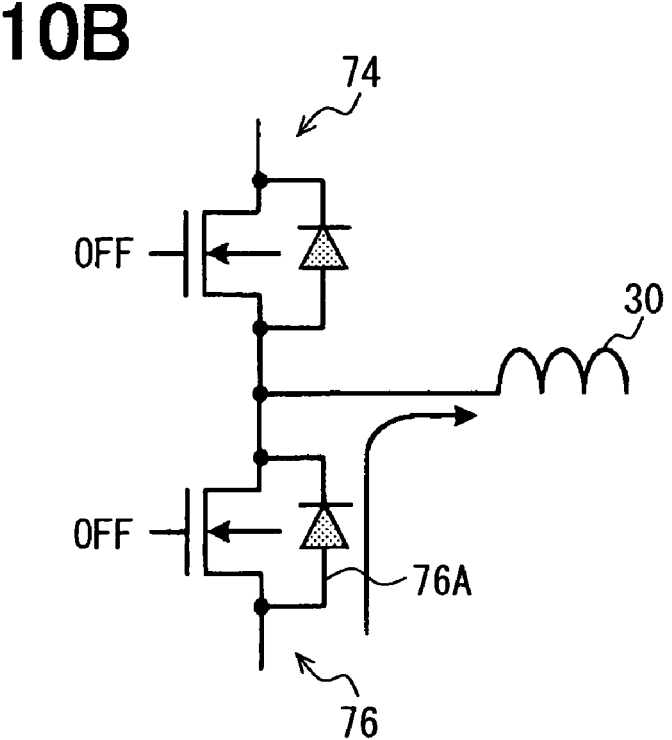
Figure 11A:
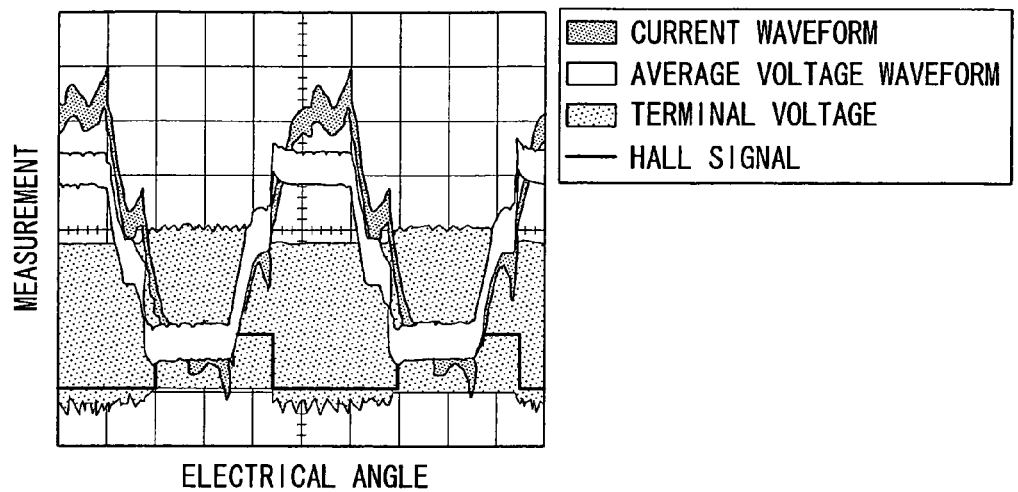
FIG. 11A is a waveform diagram showing exemplary oscilloscope waveforms in a case of a complementary PWM control scheme.
Figure 11B:
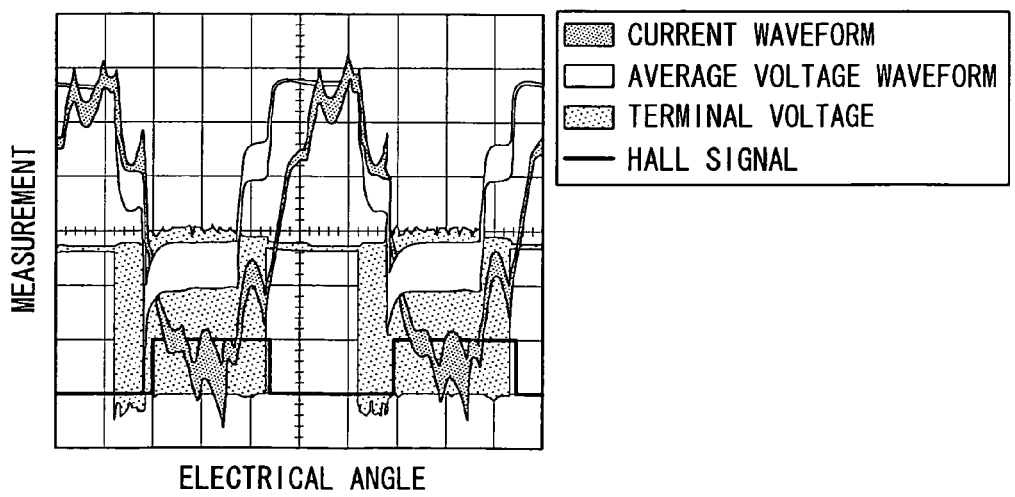
FIG. 11B is a waveform diagram showing exemplary oscilloscope waveforms in the case of the lower-arm PWM control scheme of the embodiment.

Even in the case of the present embodiment, in which the lower-arm PWM control scheme is used, the resultant voltage is similar to that of the complementary PWM control scheme. With reference to FIGS. 10A and 10B, when the upper FET 74 is changed from the ON state to the OFF state (changed from the state of FIG. 10A to the state of FIG. 10B), the current tends to continuously flow due to the influence of the motor inductance. Therefore, the current flows through a diode 76A of the FET 76. Although both of the FET 74 and the FET 76 are held in the OFF state, the low level voltage is measured at the coil 30. As discussed above, practically, the lower-arm PWM control scheme and the complementary PWM scheme provide the similar result. FIG. 11A shows oscilloscope waveforms, which are generated in the case of executing the nonsymmetrical energization control operation of the present embodiment using the complementary PWM control scheme. FIG. 11B shows oscilloscope waveforms, which are generated in the case (the case of the present embodiment) of executing the nonsymmetrical energization control operation of the present embodiment using the lower-arm PWM control scheme. As shown in FIGS. 11A and 11B, when the PWM control operation is executed on the FET 74 based on the above equation (1) only for the period from the timing of changing the output voltage of the FET 74 to zero until the time of elapsing of the predetermined time period, a trapezoidal wave having an average voltage waveform of an ideal non-axisymmetric pattern is outputted on the coil 30, like in the case of the complementary PWM control scheme.

In the present embodiment, the count time period of the slope counter 65 is set to be the constant time period regardless of the rotational speed of the motor 16, and the slope is fixed to the given value. However, the present invention is not limited to this. For example, the slope may be adjusted by changing the count value per unit time based on the rotational speed. This change of the count value per unit time may be accomplished by, for example, setting the electrical angle, which is required for the down-count. In the case where the slope is adjusted, the circuit structure is more complicated in comparison to the present embodiment, and the load on the computation of the drive duty value is increased in comparison to the present embodiment. It has been experimentally confirmed that there is no substantial difference in terms of the effect of limiting generation of the sound and vibration between the case of fixing the slope to the given value and the case of adjusting the slope based on the rotational speed. Therefore, it is desirable to fix the slope to the given value like in the present embodiment in view of the effect and costs.

Also, the coils 30 of the present embodiment are discussed as the stator coils having the star connection (see FIG. 2). However, the present invention is not limited to this. For instance, the coils 30 may be stator coils having a delta connection. Furthermore, in the present embodiment, the motor having the six-pole rotor magnet 24 is depicted (see FIG. 2). However, the present invention is not limited to this. For instance, the number of the magnetic poles can be any appropriate number, and a plastic magnet may be used in place of the rotor magnet 24.

As described above, in the present embodiment, the PWM generator 68 outputs the PWM signal, which is generated by using the PWM timer, to the gate of the corresponding FET 76. Also, the PWM generator 68 outputs the PWM signal, which is the predetermined signal, to the gate of the corresponding FET 74. When the timing t1-t6 of changing the output voltage of the FET 74, 76 to the coil 30 to zero is reached, the counting operation of the slope counter 65 is started to execute countdown from the maximum value of 221 to the minimum value of 0 (zero). The controller 64 controls the PWM generator 68 through the nonsymmetrical energization control operation to generate and output the PWM signal based on the count value of the slope counter 65. The PWM generator 68 computes the drive duty values based on the equations (1) and (2), and the PWM generator 68 generates the PWM signals based on the computed drive duty values and outputs the generated PWM signals to the FETs 74, 76. When the predetermined time period is elapsed since the timing t1-t6, or when the time period, which corresponds to the electrical angle of 40 degrees, is elapsed before the elapsing of the predetermined time period, the slope counter 65 terminates the countdown. Furthermore, the controller 64 terminates the nonsymmetrical energization control operation.

As discussed above, according to the present embodiment, each corresponding coil 30 is supplied with the voltage of the nonsymmetrical waveform, which is formed through the control operation of the controller 64 by adding the voltage, which is formed according to the count value generated at the slope counter 65, to the voltage of the rectangular wave. Therefore, the change of the energization of the coil becomes slow or gradual. As a result, it is possible to limit the generation of the sound and vibration caused by the generation of the torque ripple, which would be generated by the return current flowing through the corresponding coil at the moment of turning off of the energization of the coil for changing the active phase of the motor to the other phase.

Furthermore, the PWM control operation is executed by adding the count value generated at the slope counter 65. Therefore, the circuit can be constructed by using the custom IC without using, for example, the microcomputer.

As a result, in the motor control apparatus 10, which realizes the PWM control scheme, the sound and vibration can be reduced with the simple circuit structure. Furthermore, the manufacturing costs can be reduced by using the simple circuit structure.

Furthermore, according to the present embodiment, the lower FETs 76 are controlled through the PWM control operation. Therefore, in comparison to the complementary PWM scheme, the circuit size can be reduced.

Furthermore, according to the present embodiment, the single slope counter 65 can be used for all of the FETs 74, 76, so that the increase in the circuit size can be limited.

In the above embodiments, the motor actuator 12 has the brushless motor 16 and the brushless motor control apparatus 10. In some cases, the motor actuator 12 itself may be constructed as a brushless motor (blower motor) having the brushless motor control apparatus 10 in the housing 14 thereof.

Additional advantages and modifications will readily occur to those skilled in the art. The invention in its broader terms is therefore not limited to the specific details, representative apparatus, and illustrative examples shown and described.

What is claimed is:

1. A brushless motor control apparatus comprising:
   a voltage supplying means for supplying a voltage of a rectangular wave from each of a plurality of pairs of switching elements to a corresponding one of a plurality of windings of a brushless motor, wherein the switching elements of each pair are connected with each other in series;
   a pulse width modulation (PWM) signal generating means for generating and outputting a PWM signal to drive the plurality of pairs of switching elements of the voltage supplying means;
   a counter that counts down to zero from a maximum value of the PWM signal through a predetermined time period; and
   a control means for controlling the PWM signal generating means such that the PWM signal generating means generates and outputs a PWM signal, which corresponds to a count value of the counter, for the predetermined time period from timing of changing the voltage of the rectangular wave, which is supplied from the voltage supplying means, to zero.

2. The brushless motor control apparatus according to claim 1, wherein:
   the PWM signal generating means outputs the PWM signal to one of the switching elements of each corresponding pair of the voltage supplying means;
   the control means controls the PWM signal generating means such that the PWM signal generating means generates and outputs the PWM signal, which corresponds to the count value of the counter, to each of the switching elements of each corresponding pair for the predetermined time period from the timing of changing the voltage of the rectangular wave, which is supplied from the voltage supplying means, to zero.

3. The brushless motor control apparatus according to claim 1, wherein the control means terminates the controlling of the PWM signal generating means at timing of reaching a predetermined electrical angle from the timing of changing the voltage of the rectangular wave, which is supplied from the voltage supplying means, to zero.

4. The brushless motor control apparatus according to claim 1, the counter is a single counter that is provided to all of the plurality of pairs of switching elements.

5. The brushless motor control apparatus according to claim 1, wherein the control means terminates the controlling of the PWM signal generating means at timing of elapsing of a period, which corresponds to an electrical angle of 60 degrees, from the timing of changing the voltage of the rectangular wave, which is supplied from the voltage supplying means, to zero.

6. A brushless motor comprising the brushless motor control apparatus of claim 1.

7. A control method of a brushless motor, comprising:
   supplying a voltage of a rectangular wave from each of a plurality of pairs of switching elements to a corresponding one of a plurality of windings of a brushless motor by a voltage supplying means, wherein the switching elements of each pair are connected with each other in series;
   generating and outputting a pulse width modulation (PWM) signal to drive the plurality of pairs of switching elements of the voltage supplying means by a PWM signal generating means;
   counting down to zero from a maximum value of the PWM signal through a predetermined time period by a counter; and
   controlling the PWM signal generating means by a control means such that the PWM signal generating means generates and outputs a PWM signal, which corresponds to a count value of the counter, for the predetermined time period from timing of changing the voltage of the rectangular wave, which is supplied from the voltage supplying means, to zero.

* * * * *